United States Patent [19]

Egami et al.

[11] Patent Number: 4,524,453
[45] Date of Patent: Jun. 18, 1985

[54] POSTAL CODE DISTINGUISHING APPARATUS

[75] Inventors: Kazunari Egami; Tetsuo Umeda; Naoto Tsukakoshi; Yasuo Nishijima, all of Tokyo, Japan

[73] Assignee: Nippon Electric Co., Ltd., Tokyo, Japan

[21] Appl. No.: 349,938

[22] Filed: Feb. 18, 1982

[30] Foreign Application Priority Data

Feb. 18, 1981 [JP] Japan .................................. 56-22557

[51] Int. Cl.³ .......................... G06K 9/00; G06K 9/72; G06K 9/20
[52] U.S. Cl. ......................................... 382/1; 382/40; 382/48
[58] Field of Search ..................... 382/48, 63, 1, 9, 40, 382/39, 57; 209/569, 583, 584, 900

[56] References Cited

U.S. PATENT DOCUMENTS

| | | | |
|---|---|---|---|
| 3,651,459 | 3/1972 | Hahn | 382/40 |
| 3,842,402 | 10/1974 | Ett et al. | 382/40 |
| 3,889,811 | 6/1975 | Yoshimura | 209/584 |
| 4,013,999 | 3/1977 | Erwin et al. | 382/48 |
| 4,034,341 | 7/1977 | Isono et al. | 382/63 |
| 4,105,997 | 8/1978 | McGinn | 382/57 |
| 4,400,828 | 8/1983 | Pirz et al. | 382/1 |
| 4,418,423 | 11/1983 | Tsuji et al. | 382/40 |

OTHER PUBLICATIONS

"Performance Evaluation of Word Recognition System with Dictionary", *Electronics and Communication in Japan*, by Abe et al., vol. 52-c, No. 6, 1969.

*Primary Examiner*—John C. Martin
*Assistant Examiner*—Michael D. Parker
*Attorney, Agent, or Firm*—Sughrue, Mion, Zinn, Macpeak, and Seas

[57] ABSTRACT

A postal code distinguishing apparatus extracts characters from an address code appearing on a mail article, forms words from the extracted characters, stores in a memory a set of key words (i.e., "ATTN", "TEL", "P.O. BOS", etc.) which indicate that a numeric code on the same line is not a postal code, compares the key words with the extracted words, and sorts the mail articles accordingly. In this manner, the various lines of the address code are "eliminated" such that the numeric code on the remaining line is automatically read out as the postal code.

9 Claims, 17 Drawing Figures

POSTAL CODE DISTINGUISHING APPARATUS

BACKGROUND OF THE INVENTION

The present invention relates generally to a mail sorting apparatus, and more particularly to a postal code distinguishing apparatus in which a postal code, as expressed by series of arabic numerals, is distinguished from the other numeric codes appearing on mail articles.

In a postal service, it is a common practice to sort mail articles by making use of the postal codes (or "zip codes") appearing on the mail articles. The postal code is customarily expressed as a series of arabic numerals of predetermined length (i.e., a seven-digit code). In general, the postal code is provided after the "state description" which is arranged on the bottom line in the address description area. One prior art mail sorting apparatus senses any bottom code described on the mail articles as the postal code, and sorts in response to the bottom code. However, in a case where either the postal code is not provided on the bottom line or another code expressing "P.O. Box", "ATTENTION", "TEL" or "PHONE" is provided on the bottom line, this prior art mail sorting apparatus will not sense the true postal code, and thus will sort the mail articles erroneously.

SUMMARY OF THE INVENTION

Therefore, an object of the present invention is to provide a postal code distinguishing apparatus which can reliably distinguish the postal code even when another numeric code other than the postal code is written on a mail article.

Another object of the present invention is to provide a postal code distinguishing apparatus which can distinguish whether a code on a mail article is a postal code or not, even when the mail article contains only one code.

According to the present invention, there is provided a postal code distinguishing apparatus comprising means for recognizing characters appearing on a mail article, means for extracting a word written on the line containing a numeric code, means for comparing the extracted word with a set of predetermined key words e.g. (P.O. Box, ATTENTION, TEL, PHONE, name of nation or country, etc.), and means for judging the significance of a numeric code contained on the same line as the word extracted by the extracting means in accordance with the comparison result derived from the comparing means, whereby the code on the same line as the extracted word is distinguished as to whether it is a postal code or not.

BRIEF DESCRIPTION OF THE DRAWINGS

FIGS. 1(a) to 1(d) show examples of address descriptions on mail articles which have a variety of codes expressed by arabic numerals;

DESCRIPTION OF THE PREFERRED EMBODIMENTS

Figure 1A:
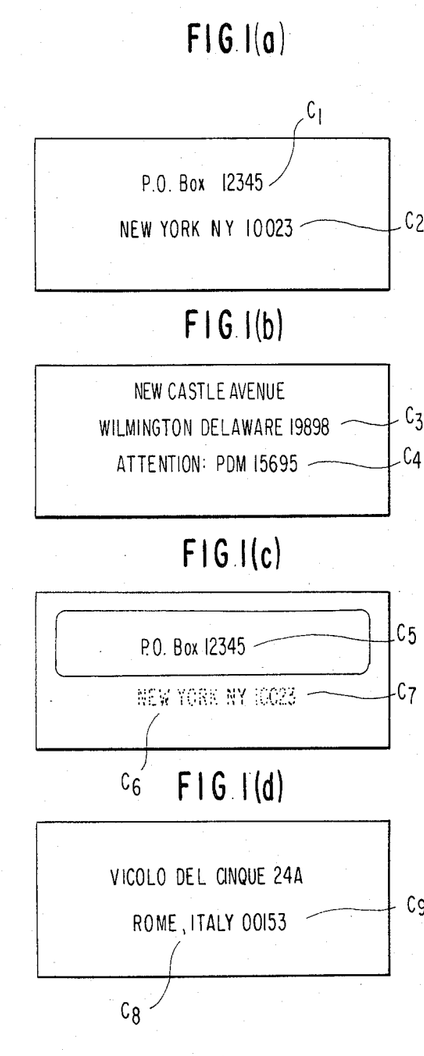

FIG. 1(a) illustrates an example of an address description which contains the words "P.O. Box", a P.O. Box numeric code (designated as $C_1$) and a postal code ($C_2$). In FIG. 1(a), the postal code $C_2$ appears on the bottom line of the address designation and can therefore be read by the prior art mail sorting apparatus. FIG. 1(b) shows another example of an address description containing a postal code $C_3$, the word "ATTENTION", and an ATTENTION code $C_4$. In the case of FIG. 1(b), the prior art mail sorting apparatus would sense the ATTENTION code $C_4$ on the bottom line as a postal code, and would thus erroneously sort the mail article.

FIG. 1(c) illustrates a further example of an address description, where a "window" is provided through which the address description is generally indicated. Note that in FIG. 1(c), only the words "P.O. Box" and a P.O. Box code $C_5$ are indicated in the window; the state name $C_6$ and a postal code $C_7$ are covered by the envelope and do not appear in the window. The prior art mail sorting apparatus would mistakenly sort the mail article of FIG. 1(c) by sensing the P.O. Box code $C_5$ as the postal code.

FIG. 1(d) shows an example of an address description on a mail article originating from the U.S.A. to be sent to Italy. In FIG. 1(d), the country name $C_8$ and an Italian postal code $C_9$ are provided on the bottom line of the address description. Since it has no capability to distinguish such foreign mail articles, the prior art mail sorting apparatus would mis-sort the mail article of FIG. 1(d) on the basis of reading the Italian postal code as a U.S. postal code.

A further improved prior art mail sorting apparatus can re-sort a mail article on the basis of another code described on the mail article if it mis-sorts the mail article in accordance with the code provided on the bottom line. However, the mail-sorting rate would be reduced by picking up the code other than the postal code even if the further improved prior art mail sorting apparatus is used.

According to the present invention, a known recognition method is employed to first judge the significance of a numeric code accompanied by a word on the same line by comparing the word with at least one of a plurality of predetermined key words, i.e., "P.O. Box", "ATTENTION", "TEL", "PHONE", country name, etc. If the code word in the address description coincides with one of the key words, the significance is judged as a code other than the postal code, and that code is not picked up as a postal code. If another numeric code is contained on another line, it is similarly processed for determining the code significance. Should the code significance be judged as a postal code, e.g., if it is judged that none of the predetermined key words are contained on the line, the code in that line is picked up as a postal code and is used for mail-sorting. The present invention can thereby eliminate the redundant time expended by re-sorting a mail article on the basis of a code other than the postal code by judging the significance of any numeric code appearing in an address description even if the mail article contains a code similar to the postal code.

One of the word recognition methods applicable to the present invention is the "contextual recognition" disclosed in "Performance Evaluation of Word Recognition System with Dictionary" *Electronics and Communication in Japan*, Vol. 52-C, No. 6, 1969. In the disclosed word recognition method, a string of read-out characters are compared character-by-character with a dictionary word. Even when there are some characters not recognized in the string, or when characters are increased or decreased by some number due to the segmentation error of characters, this method can compare the string of input characters with the dictionary word and can recognize the string of input characters by using a redundancy accompanied with the word. The method described above will be hereinafter referred to as the "dynamic programming" (DP) matching method.

Figure 2:
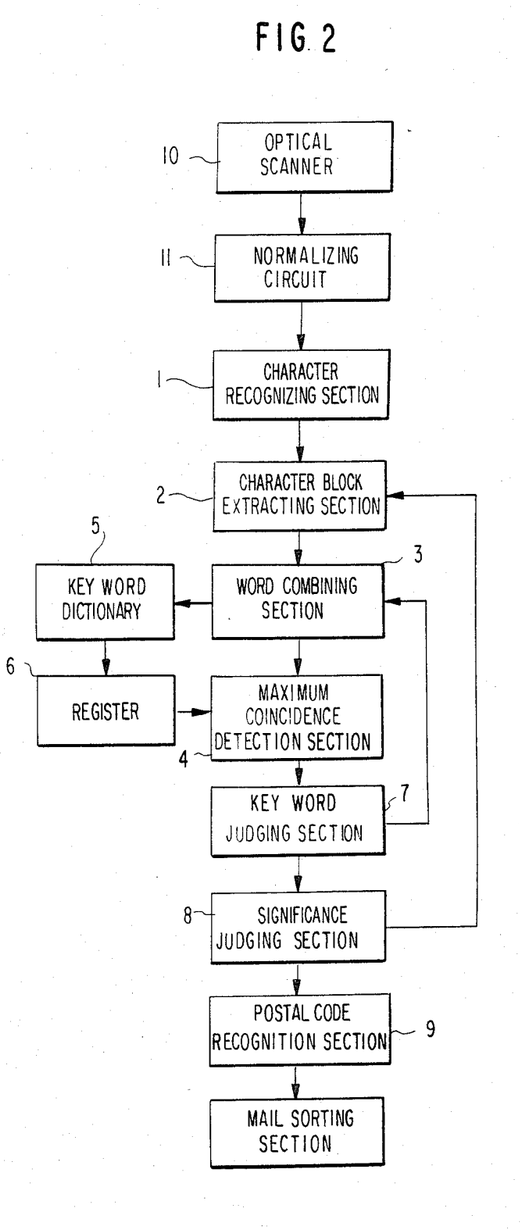
FIG. 2 is a block diagram of an embodiment according to the present invention.
Figure 3A:
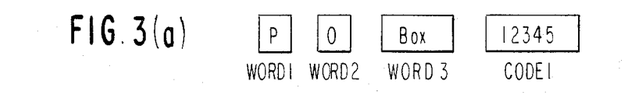
FIGS. 3(a) and 3(b) illustrates an arrangement of the address shown in FIG. 1(a)
Figure 3B:
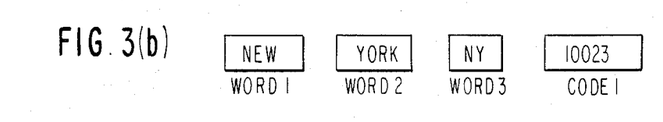

FIG. 2 shows an embodiment of the present invention. A character recognition section 1, receiving character patterns delivered from an optical scanner 10 and transmitted through a normalizing circuit 11, recognizes the character patterns. A character block extracting section 2 extracts character blocks or character clusters, i.e., words consisting of at least one character or codes consisting of at least one arabic numeral, from the series of characters delivered from the character recognition section 1. For example, in the case of FIG. 1(a), the character series are separated into plural blocks as shown in FIGS. 3(a) and 3(b) which correspond to the upper and lower lines in FIG. 1(a). The words (or the code numbers placed under each word or code) as shown in FIGS. 3(a) and 3(b) are attached by the character block extracting section 2. In this process, each line is divided into an upper line or a lower line and processed unidirectionally, i.e., from the right or left end thereof, in progression. In the present embodiment, the line process progresses from upper to lower and from left to right. As a matter of course, the same process may be reversed. As is well known, the block segmentation of the input character series in the character block extracting section 2 depends on the blank spaces, commas, periods, hyphens, etc. appearing between the words in the line.

Figure 4A:
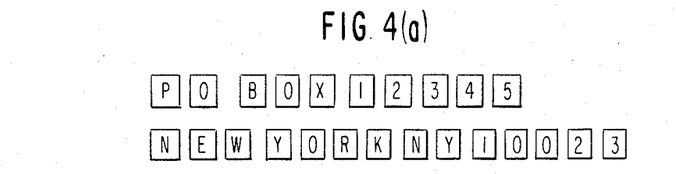
FIGS. 4(a) to 4(c) illustrate the contents of data stored in the character recognition section shown in FIG. 2.
Figure 4B:
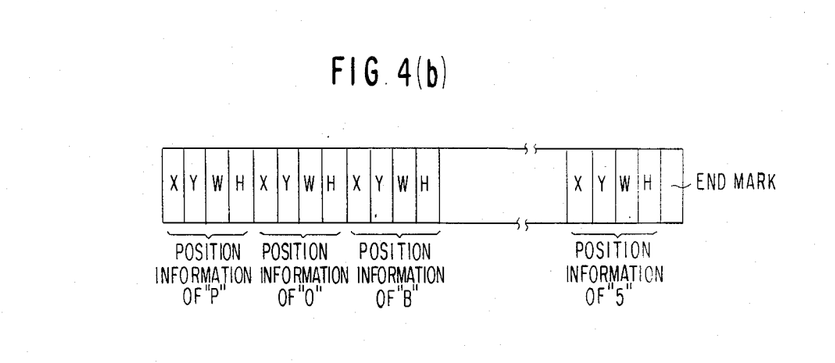
Figure 4C:
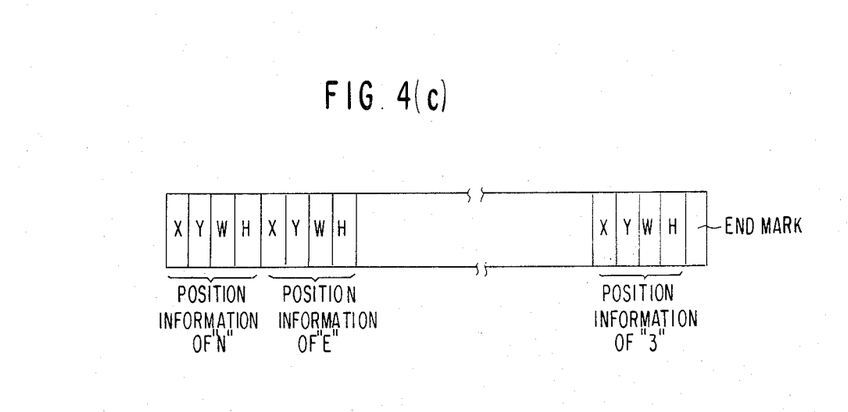

FIG. 4 illustrates inputs to the character recognition section 1. FIG. 4(a) shows input character patterns segmented every character. FIG. 4(b) shows the format of the position information (XY) corresponding to the characters in the upper line of the input pattern in FIG. 4(a), as well as information representing the size of these characters before they are normalized, i.e., the width (W) and the height (H). FIG. 4(c) shows similar information corresponding to the characters of the lower line of the input patterns in FIG. 4(a). There are many known recognition methods applicable to this recognition function, such as a template matching method.

Figure 5:
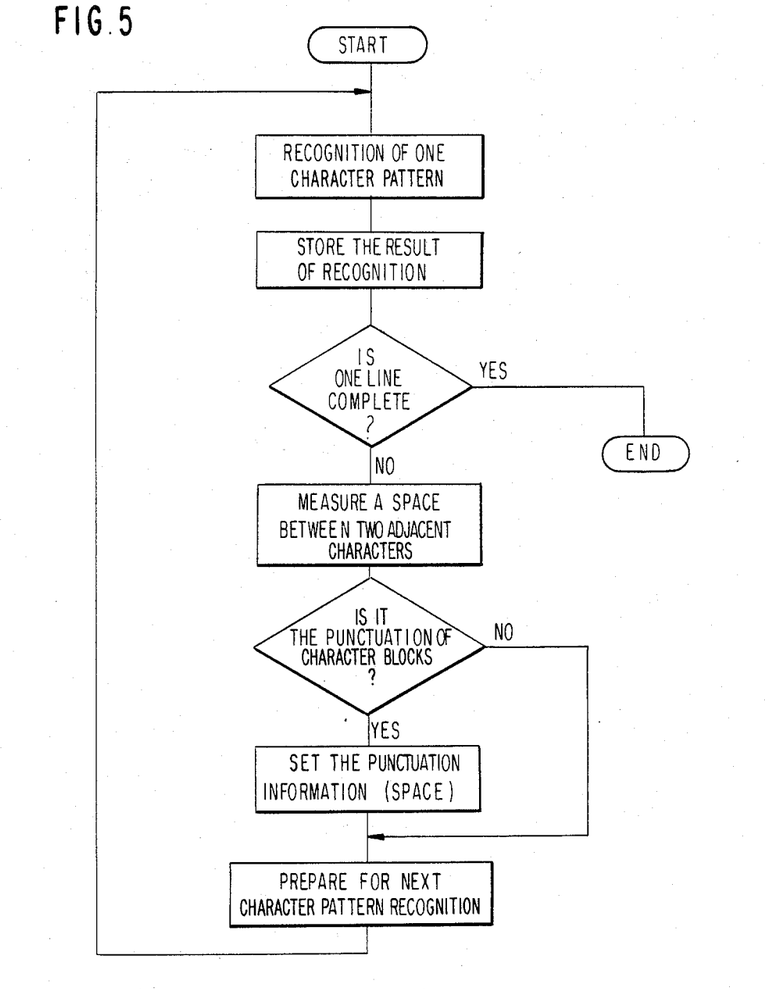
FIG. 5 illustrates the logic flowchart of the character recognition section.

The logic of the character recognition section 1, which is illustrated in FIG. 5, is as follows: First, the input character pattern "P" in the upper line is recognized and whether or not the line has been completely processed is determined; if it has not, it is judged whether or not the adjacent character belongs to the word; if it has, the orocess is stopped or moved to the next line. When the adjacent character does not belong to the word; the space information is set for the punctuation of the word; on the other hand, if it does belong to the word, the recognition section is readied for the recognition process of the adjacent character pattern. Accordingly, the character recognition section 1 produces output data of the format shown in FIG. 6. For the detection of the punctuation among the words or codes, the space between the adjacent characters is used. The space between the adjacent characters is measured by using the position information and the size information of the characters. When the measured space size is smaller than a predetermined value, it is determined that two characters are contained in the block, i.e., they are of the same word or code. Conversely, when the space size is larger than the predetermined value, it is detected as a block border, i.e., as a word or code border.

Figure 6:
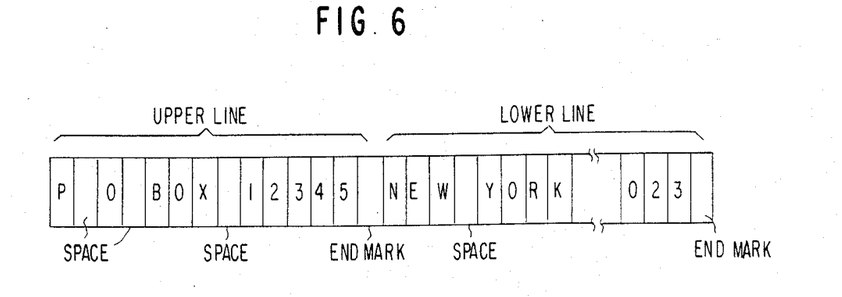
FIG. 6 illustrates a format of output data derived from the character recognition section shown in FIG. 2.
Figure 7:
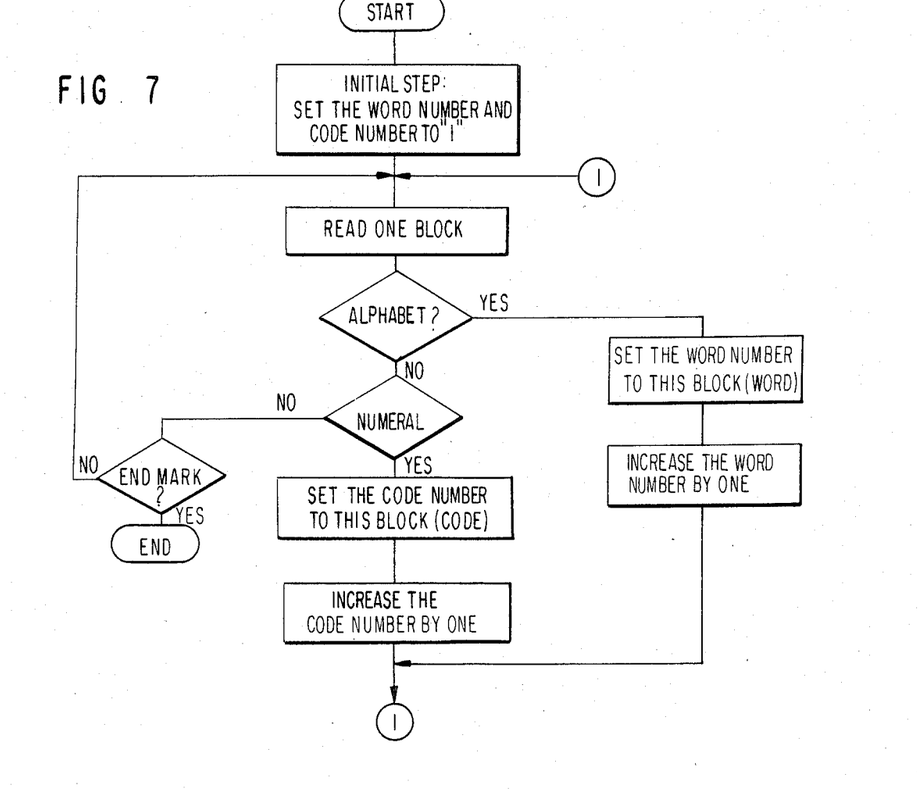
FIG. 7 illustrates the logic flowchart of the block extracting section shown in FIG. 2.

The block extracting section 2 receives the output data from the character recognition section 1 as shown in FIG. 6, and extracts blocks of words or codes for each line by associating word segmenting information with each word or code as can be seen with reference to FIGS. 3(a), 3(b) and 6. The extraction process follows the flowchart shown in FIG. 7. With reference to FIG. 7, the word numbers and code numbers are initially set to "1", and one block is then read out and checked as to whether it is an alphabetic or numeric word. If it is an alphabetic block, the word number "1" is attached to that block and the word number to be attached to the next word is incremented to "2". On the other hand, if the block is numeric, the code number "1" is attached to the block, and the code number to be attached to the next code block is incremented to "2". Individual words or codes are extracted in this manner until an end mark is detected, at which time the block extraction for one line is completed. As will be described below, if the subsequent processing of the data for this line indicates that the numeric code is other than the postal code, the block extracting process for the next line is performed.

Figure 8A:
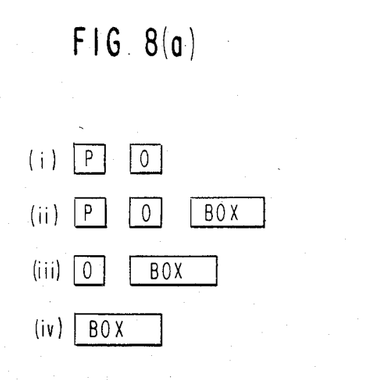
FIGS. 8(a) and (b) illustrate combinations of words determined by a word combining section in the example of the address shown in FIG. 1(a)
Figure 8B:
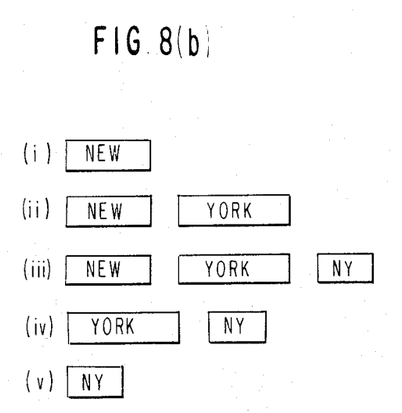
Figure 9:
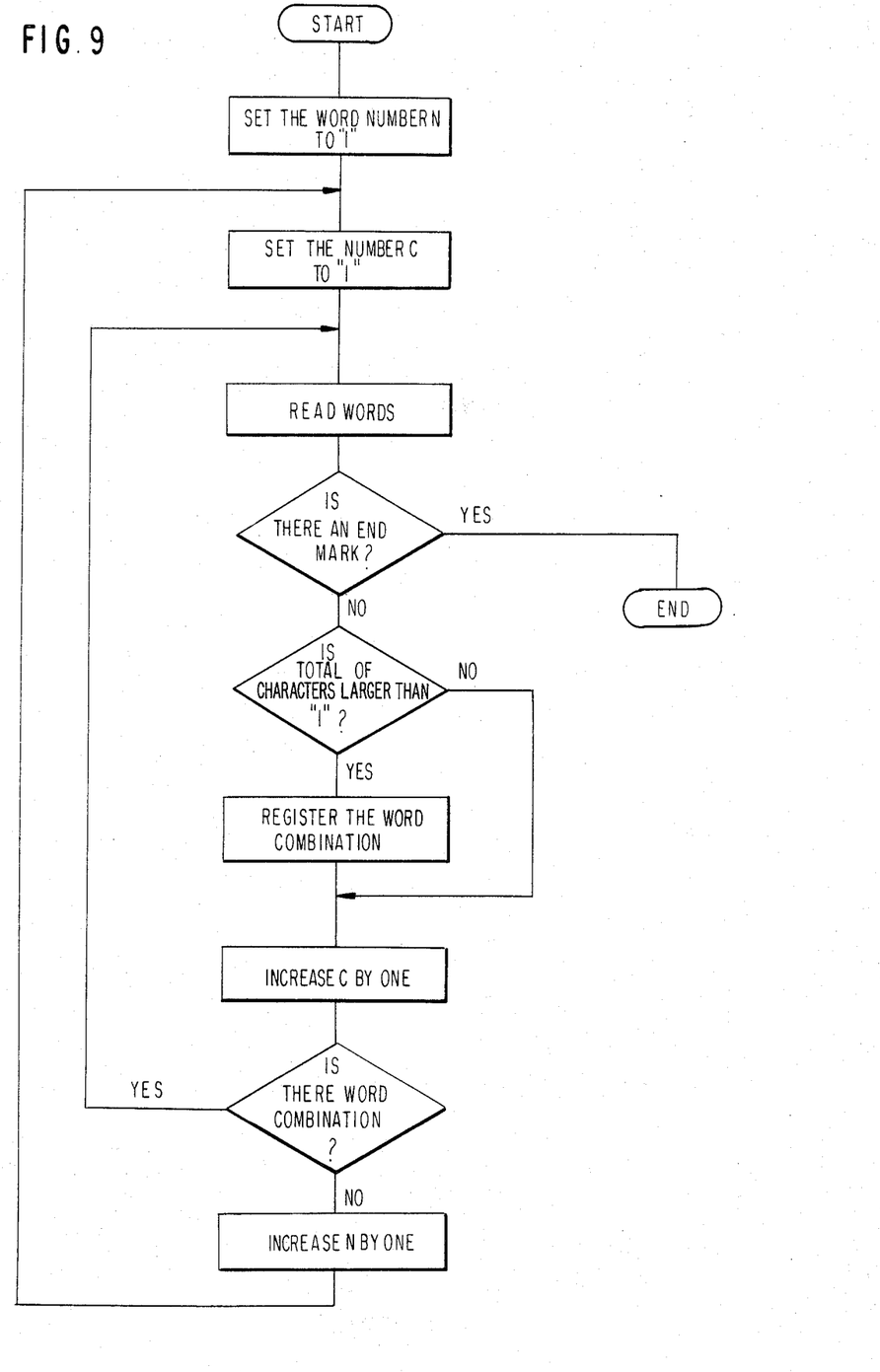
FIG. 9 illustrates the logic flowchart of the word combining section shown in FIG. 2.

Referring back to FIG. 2, a word combining section 3 determines a word combination on the basis of the output from the block extracting section 2. For example, the words shown in FIG. 3(a) and 3(b) are combined as shown in FIGS. 8(a) and 8(b), respectively. The process in the word combining section 3 is executed according to the flowchart shown in FIG. 9. In FIG. 9, a word number N is a base reference and a count number C is the number of words contained in the word combination. Both N and C are initially set to "1". The word combination consisting of C words starts from the word of word number N. In the example of FIG. 3(a), the word 1 "P" is first read out. However, the word "P" is not registered as a word combination since this combination, i.e., the word "P", consists of only one character. The number C is increased by one. The word combination consisting of two words starting from the word 1, i.e., "PO" in FIG. 8(a), is registered. The number C is again increased by one and "P.O. Box" is registered. After the combining process of all the word combinations starting from the word 1 are completed, the word number N is increased by one and the combining process of the combinations starting from the word 2 starts, and the word combination "O Box" in FIG. 8(a) is registered. As for the combinations starting from the word 3, "Box" is registered. The combinations in FIG. 8(b) are then prepared as in the case of the address description shown in FIG. 3(b).

The word combinations are each compared with at least one key word stored in a key word dictionary 5 in order to determine the significance of their accompanying numeric codes. To this end, the word combining section 3 reads out the key words from the key word dictionary 5 and stores them into a register (or temporary memory) 6 as shown in FIG. 2. In practice, the key words read out from the dictionary 5 are conditioned prior to comparison; that is, only those key words in which either the number of characters is nearly equal to that of the word combination or the beginning characters of the key word are the same as of that of the word combination are removed from memory for comparison. When the number of the key words stored in the key word dictionary 5 is small, all of the key words may be compared with the word combination. A maximum coincidence detecting section 4 (as shown in FIG. 2) compares all the dictionary key words to the word combination by the DP matching method. Then, the detecting section 4 transfers both the comparison key word with the highest degree of coincidence, and the degree of the coincidence with the word combination per se, to a key word judging section 7. The key word judging section 7 stores all the key words and their degrees of the coincidence for a given word combination. The numeric code to be transmitted to the code significance judging section 8 is delivered from the character block extracting section 2 and is held in the judging section 7 pending completion of the comparison. When all the word combinations are prepared and the comparisons are finished, the judging section 7 determines the key word with the maximum coincidence to the particular word combination. When the degree of the maximum coincidence of the determined key word is larger than a threshold value, the judging section 7 judges the determined key word to be the key word indicating the significance of the code of the line and transfers the key word to a code significance judging section 8. On the other hand, when the degree of the maximum coincidence is smaller than the threshold value, the judging section 7 judges that the detected key word is not the key word indicating the significance of the code of the line, and the judging section 7 does not transfer key word to the attribute judging section 8 but instead transfers only the numeric code contained in the line.

Figure 10:
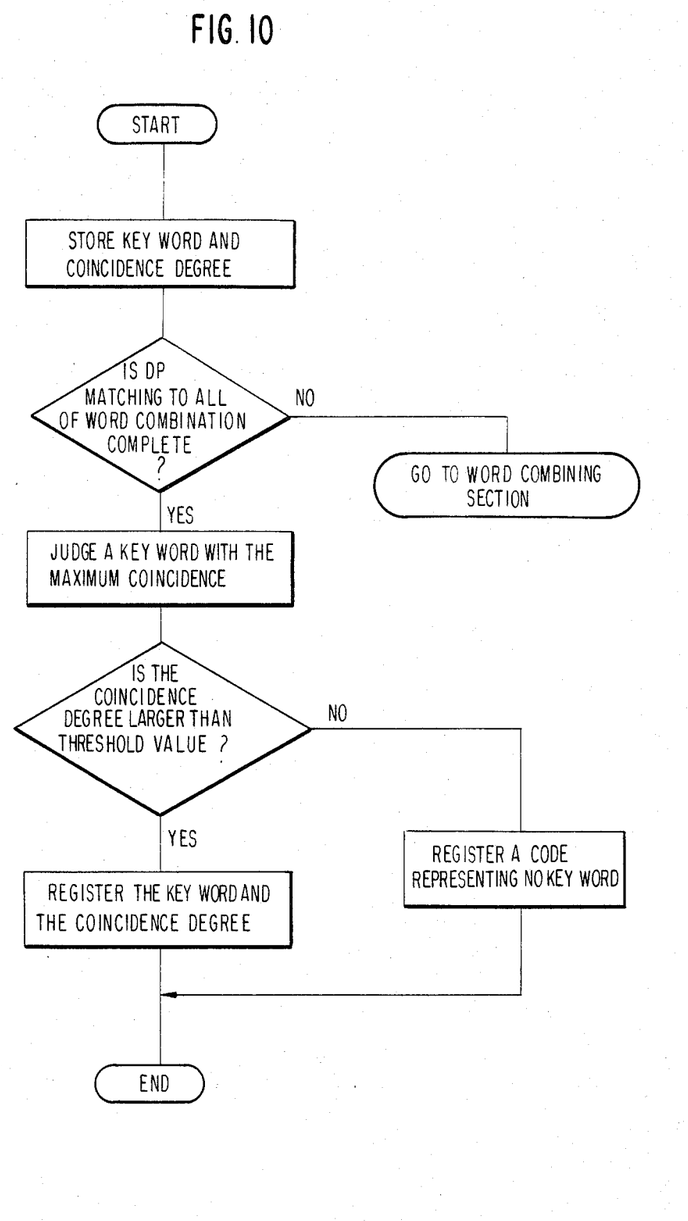
FIG. 10 illustrates a logic flowchart of the key word judging section shown in FIG. 2.

The process flow of the key word judging section 7 will now be described in greater detail with reference to FIG. 10. When the information on the upper line (as in FIG. 3(a)) is processed, the word combining section 3 determines the combinations shown in FIG. 8(a). The combination "P,O" is first selected. The combination "P,O" is compared with a key word stored in the register 6 by the D.P. matching method. As a result of the comparison, the key word with a maximum coincidence is selected and transferred to the key word judging section 7. The key word judging section 7 stores the key word and the degree of the coincidence into a memory. Then, it determines whether or not the process of all the combinations of the words has been completed. In this case, the process of three combinations "P.O. Box", "O, Box" and "Box" have not yet been completed. Therefore, a key word corresponding to "P.O. Box" is read out and subjected to the D.P. matching method. The "O,Box" and "Box" are also subjected to the D.P. matching. The key words corresponding to these combinations and the degrees of the coincidence are registered. When a proper key word is not found, a code indicating "no proper key word" and a coincidence degree of zero are registered. They key word with the maximum coincidence is selected, and if the coincidence degree of the selected key word is larger than a threshold value, the key word selected is used as the key word of the line. Conversely, when it is smaller than the threshold value, it is determined that no key word is contained in the line, and only the code contained in the line is transmitted to the section 8. In the case of the upper line in FIG. 3, "P.O. Box" is detected as the key word indicating the code significance.

The code significance judging section 8 judges that a code contained in the line is a zip code when no key word is delivered from the key word judging section 7, and judges that the code contained in the line is some special code other than the zip code when a key word is delivered from the key word judging section 7. For example, when the upper line in FIG. 3(a) is processed and the key word judging section 7 delivers a detected key word to the significance judging section 8, the code significance judging section 8 judges that the code "12345" is a special code other than the postal code. The character block extracting section 2 then operates to execute the complete process on the lower line of FIG. 1(a) to obtain the extraction data shown in FIG. 3(b). In the processing of the lower line, no key word is positively identified, and the key word judging section 7 therefore delivers no key word to the significance judging section 8. The code delivered to the significance judging section 8 is then regarded as the zip code and is supplied to a postal code recognition section 9 to be used for mail sorting. In passing, note that using a place name such as NEW YORK as a key word of the lower line including the postal code 2 would be immediately recognizable as the significant of a line which is indicative of the fact that the code following it must be a postal code. However, the number of the place names is tremendously large, e.g., several thousands or several tens of thousands, which would require a corresponding memory capacity for the dictionary memory, and a long processing time.

The processing of the other address descriptions shown in FIG. 1 will now be considered. In the case of FIG. 1(c), since "P.O. Box" is detected as the key word indicating a code other than a postal code, the erroneous recognition and sorting never occur. As for the case of FIG. 1(b), by registering "ATTENTION" as a key word, the lowermost line can be detected "invalid" in terms of possessing the postal code, and the code "19898" on the second line is thereby distinguished as a postal code. As for the case of FIG. 1(d), by registering the names of commonly addressed countries such as Italy (of which there are approximately 100 to 200), that mail can be recognized as foreign mail.

As seen from the foregoing, the present invention has the following advantages: (1) when plural lines, containing both a postal code and other codes similar to the postal code, are present in the address description area on the mail article, only the postal code will be extracted; (2) when only one code similar to a postal code but not a postal code is contained in an address description, the postal code distinguishing apparatus according to the present invention can determine that it is not a postal code if the line containing the code has a special key word as described above; and (3) when plural lines are contained in an address description area, the present invention can distinguish an "invalid" line indicating other than an address or a postal code (i.e., "ATTENTION") and skip to the valid line for recognition, such that the speed of sorting mail articles effectively rises.

According to the present invention, furthermore, even if a mail article has a description containing a plurality of lines, it is possible for a mail sorting apparatus to increase the speed of mail sorting by skipping the further recognition of any line determined to be invalid. Explaining in more detail, if some lines described on the mail articles include address descriptions, and the remaining lines have indications other than such address descriptions, the apparatus according to the present invention operates as follows: the significance of one line is distinguished by comparing at least one word contained in that line with one of a plurality of key words (such as, "P.O. Box", "ATTENTION", "TELEPHONE", "TEL", "PHONE", names of nations other than United States of America, etc.) which represent information other than the U.S. address indication. When a significance other than an address indication is detected, the line is skipped for further recognition. The remaining lines are picked up and the postal code is recognized as previously described.

We claim:

1. A code distinguishing apparatus, comprising:
   means for recognizing characters existing in an address description on an article, said address description including at least one word and at least one code on the same line;
   means for extracting said at least one word from said characters recognized by said recognizing means;
   memory means for storing at least one predetermined key word indicating the significance of a code contained on the same line as said key word;
   means for comparing said at least one word extracted by said extracting means with said key word stored in said memory means; and
   means for determining the significance of said at least one code in response to the output delivered from said comparing means.

2. A code distinguishing apparatus comprising:
   means for recognizing characters in an address description on an article, wherein at least one word and at least one code are on a single line of said address description;
   means for extracting said at least one word from said characters recognized by said recognizing means;
   dictionary memory means for storing a plurality of predetermined key words each indicating the significance of a respective code associated therewith;
   means for determining the degrees of coincidence between said at least one word extracted by said extracting means and each of said key words stored in said dictionary memory means; and
   means upon receiving said degrees of coincidence determined by said determining means, for determining the significance of said at least one code by selecting the key word with the highest degree of coincidence.

3. The code distinguishing apparatus as claimed in claim 2, said extracting means including:
   means for segmenting said characters recognized by said recognizing means into a plurality of clusters of characters; and
   means for sequentially delivering each of said character clusters and combinations of said character clusters as said at least one word.

4. A postal code recognition apparatus, comprising:
   means for extracting at least one word from an address line described in an address description on a mail article, said address description comprising a plurality of lines;
   a dictionary memory means for storing a plurality of predetermined key words each indicating the significance of a respective numeric code associated therewith;
   means for comparing said at least one word with one of said key words stored in said dictionary memory means;
   means for skipping further recognition of said at least one word when said at least one word is determined to correspond to one of said key words by said comparison means.

5. The code distinguishing apparatus of claim 3, wherein said character recognizing means comprises means for determining word segmenting information as a function of the length of spaces between said characters.

6. The code distinguishing apparatus as claimed in claim 4, wherein said means for extracting extracts a plurality of words from said line and said means for determining the degrees of coincidence determines degrees of coincidence for each of said plurality of extracted words.

7. A code distinguishing apparatus, comprising:
   recognition means for recognizing characters, said characters comprising a first set of characters representing at least one word and a second set of characters representing at least one code;
   means for extracting said at least one word from said recognized characters; and
   means for determining the significance of said at least one code in accordance with said extracted word.

8. The code distinguishing apparatus as claimed in claim 7, wherein said means for determining includes means for storing at least one predetermined key word, and means for comparing said extracted word to said key word.

9. The code distinguishing apparatus as claimed in claim 8, wherein said at least one code is determined to be a postal zip code in response to the absence of correspondence between said at least one word and said at least one key word.

* * * * *